United States Patent [19]

Gunschmann

[11] 4,080,639
[45] Mar. 21, 1978

[54] ADJUSTABLE ASSEMBLY ELEMENTS FOR A SCANNING DEVICE FOR MAGNETIC TAPE INSTRUMENTS

[75] Inventor: Peter Gunschmann, Darmstadt, Germany

[73] Assignee: Robert Bosch GmbH, Darmstadt, Germany

[21] Appl. No.: 685,381

[22] Filed: May 11, 1976

[30] Foreign Application Priority Data

May 22, 1975 Germany .............................. 2522581

[51] Int. Cl.² .................. G11B 21/24; G11B 5/56; G11B 5/52; G11B 21/04
[52] U.S. Cl. ................................ 360/107; 360/109; 360/130
[58] Field of Search .................. 360/107, 109, 84, 130

[56] References Cited

U.S. PATENT DOCUMENTS

| 2,820,688 | 1/1958 | Philbrick, Jr. | 360/109 |
| 3,075,049 | 1/1963 | Gordon et al. | 360/84 |
| 3,333,753 | 8/1967 | Streets | 360/84 |
| 3,376,395 | 4/1968 | Rumple | 360/84 |
| 3,567,869 | 3/1971 | Hirota et al. | 360/107 |
| 3,995,317 | 11/1976 | Schmidt | 360/107 |

Primary Examiner—Alfred H. Eddleman
Attorney, Agent, or Firm—Ernest F. Marmorek

[57] ABSTRACT

Adjustable assembly elements for adjusting and aligning the head wheel and the motor of a magnetic tape instrument using diagonal track scanning, with respect to each other and the two-part stationary guide drum type housing in which they are contained.

9 Claims, 1 Drawing Figure

ADJUSTABLE ASSEMBLY ELEMENTS FOR A SCANNING DEVICE FOR MAGNETIC TAPE INSTRUMENTS

CROSS-REFERENCE TO RELATED APPLICATIONS

Reference is had to the patent to Rudolf Prochnow, U.S. Pat. No. 3,666,894, issued May 30, 1972. Reference is also had to the following co-pending applications: Ser. No. 616,808 by Rudolf Prochnow et al., filed Sept. 25, 1975; Ser. No. 669,347 by Rudolf Prochnow, filed on Mar. 22, 1976; and Ser. No. 604,626 by Peter Gunschmann (the applicant of the instant application), filed Aug. 14, 1975. The assignee of the applications is the same as the assignee of the instant application; Robert Bosch GmbH. The assignee of the issued patent is a predecessor of the assignee of the instant application.

SUMMARY OF THE INVENTION

The invention relates to a scanning device for a magnetic tape instrument with diagonal tracking scanning, wherein there is a head wheel having at least one magnetic head and being driven by a head wheel motor. This motor-head wheel assembly is housed in a two-part casing or stationary guide drum.

The invention relates more particularly to adjustable assembly elements for assembling and adjusting the head wheel-motor assembly within the stationary guide drum housing.

To realize the required high relative velocities between the electromagnetic transducers or magnetic tape heads and the magnetic tape, as is required in the case of retrieval of wide band magnetic signals from recording tape, scanning systems have been developed wherein the magnetic heads which are arranged at the periphery of rapidly revolving head wheels, scan the relatively slower moving magnetic tape at an angle with respect to the center line of the tape. The stored information is applied to the magnetic tape in a series of parallel track segments closely spaced apart from one another, the information being retrieved using a similar system to that used for the recording process, as is known.

Because of the high rate of speed at which the magnetic heads move over the magnetic tape, in order to facilitate optimum signal transfer, close contact between the magnetic heads and the magnetic tape must be maintained.

As a result of both the considerable pressure exerted by the magnetic heads on the magnetic tape and the high velocity with which the head wheel glides the magnetic heads over the magnetic tape, a rapid deterioration of the mechanical tolerances within which the scanning device must be maintained, occurs. In practice, it becomes frequently necessary to change worn magnetic heads for new ones. Because of the high degree of accuracy with which the magnetic heads must be arranged with respect to the head disc, the changing of the magnetic heads alone will not normally result in a properly aligned scanning device. Normally the head disc must be renewed and the magnetic heads readjusted.

To accomplish the proper relative adjustment between the magnetic heads and the head disc, the head wheel on which the magnetic heads are mounted must be detached from the driving motor shaft, and after alignment, reattached to the motor. Because of the high precision with which the mechanical tolerances must be maintained, it has been the usual practice to have these operations carried out at the manufacturer's plant, with the attendant losses in time and considerable costs. As the shaft to which the head wheel is secured is normally the motor shaft of the driving motor, it was necessary to practically dismantle the entire scanning device to accomplish the exchange of magnetic heads.

It is therefore one of the principal objects of the invention to provide a construction of a head wheel mounting which makes possible an easy, quick and relatively trouble-free change of the head wheel.

Further objects and advantages of the invention will be set forth in part in the following specification and in part will be obvious therefrom without being specifically referred to, the same being realized and attained as pointed out in the claims hereof.

Other objects of the invention will in part be obvious and will in part appear hereinafter.

With the above and other objects of the invention in view, the invention consists in the novel construction, arrangement and combination of various devices, elements and parts, as set forth in the claims hereof, one embodiment of the same being illustrated in the accompanying drawings and described in the specification.

The invention accordingly comprises the features of construction, combination of elements and arrangement of parts which will be exemplifed in a construction hereinafter set forth and the scope of the application of which will be indicated in the claims.

BRIEF DESCRIPTION OF THE DRAWING

For a fuller understanding of the nature and objects of the invention, reference should be had to the following detailed description, taken in connection with the accompanying drawing, in which.

Description of the Preferred Embodiment

Figure 1:
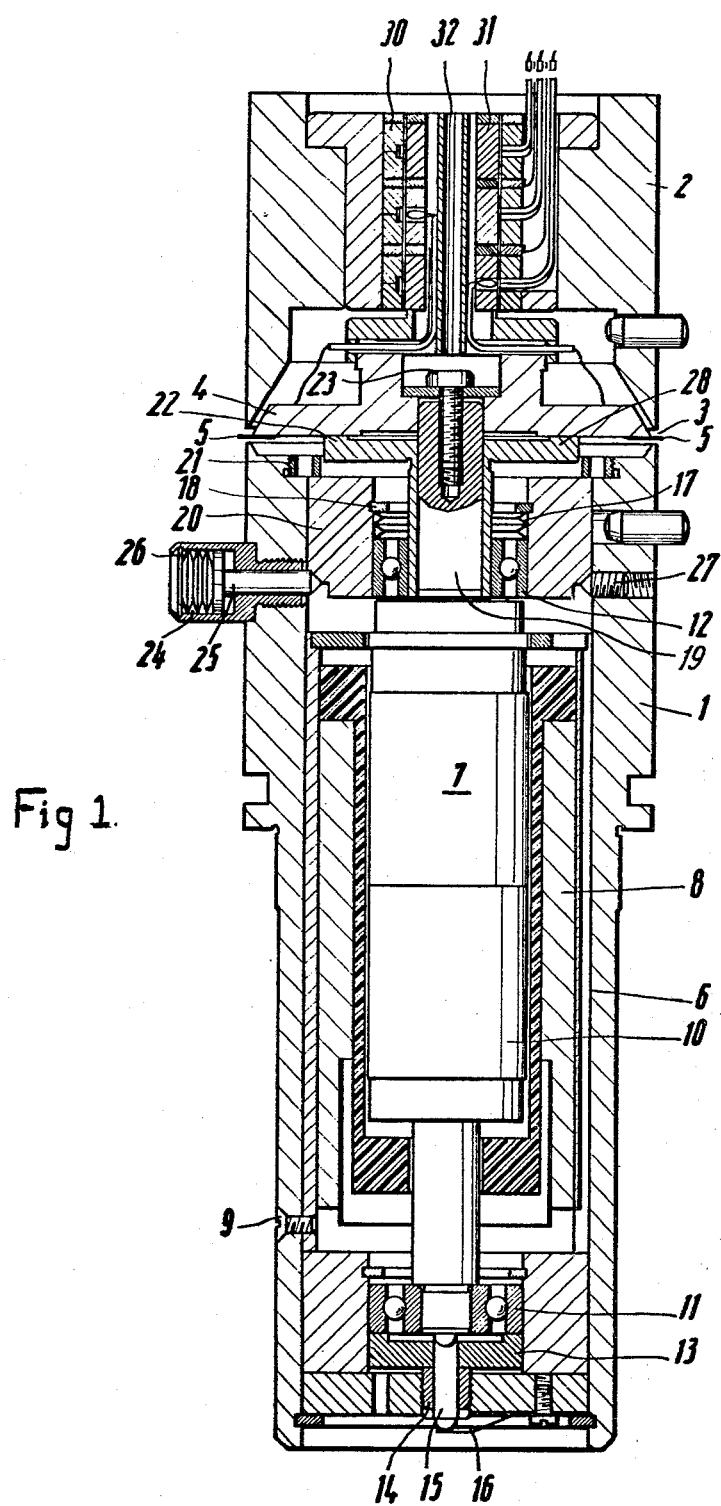
FIG. 1 is a sectional view of a scanning device including the instant invention.

In carrying the invention into effect in the embodiment which has been selected for illustration in the accompanying drawing and for description in the specification, and referring particularly to the FIGURE, wherein the housing or stationary guide drum is formed in two parts; a lower portion 1 and an upper portion 2. Between these two portions is a slit or separation 3 within which the head wheel 4 carrying the magnetic heads 5 mounted on its periphery, rotates concentrically with respect to the two guide drum portions 1, 2. The lower portion 1 of the guide drum contains the head wheel or driving motor 7 in a cylindrical bore hole 6. The stationary portion or casing 8 of the head wheel or driving motor 7 is slid into the bore hole 6 and normally secured therein by means of three countersunk screws 9, displaced by 120° with respect to each other.

The rotor 10 of the head wheel motor 7 is rotatably supported by the lower bearing 11 and the upper bearing 12. The bearings 11, 12 are normally of the ball-bearing or similar type having an inner collar or assembly secured to the rotating portion of the motor, or rotor 10 and an outer stationary part.

The adjustment of the path through which the magnetic heads 5 mounted on head wheel 4 follow, is accomplished by adjusting the relative positions of the bearings 11, 12 with respect to the casing or stationary guide drum 1, 2. The lower bearing 12 can be vertically adjusted by means of pressure disc or thrust washer 13 and the headless screw or threaded rod or pin 14. A ground connection pin 15 and a leaf-type spring 16 are normally provided to ground the rotor 10 electrically to the housing, to thereby reduce electrical disturbancies caused by grounding the rotor 10 through the ball-bearings 11, 12. The upper bearing 12 of rotor 10 is maintained under tension in the longitudinal direction by means of cup-spring units 17 acting against the outer ring of bearing 12 and against a retaining ring 18. The outer ring or stationary portion of bearing 12 is inserted into a jacket 20 to form a larger stationary unit part of the bearing, the latter being contained in bore hole 6 by means of a threaded ring 21.

To obtain a high degree of information transfer from the magnetic tape, which is moved around the outside of the periphery of the guide drum 1, 2, it is necessary that the axis of rotation of the head wheel 4 coincide very closely with the longitudinal or central axis of the guide drum portions 1, 2. During contact with the magnetic tape, it is necessary that each of the two magnetic heads 5 describe as perfect a concentric path with respect to the cylinder surface of the guide drum portions 1, 2, as possible. In order to accomplish this, it is necessary that the take-up plate 28 be accurately fitted and aligned with the shaft-butt 19 of the motor 7 and that its bearing surface 22 be precisely and accurately disposed on the take-up plate 28. When this is properly accomplished, the head wheel 4, when secured by means of a central fastening device 23 to the shaft 19, rotates and describes a proper circle with the heads 5. Flutter or wobbling of one part with respect to the other is substantially eliminated. The central fastening device is preferably a threaded rod or screw 23 which can be driven into a threaded bore provided in the end of shaft 19.

Provision for centering the the head wheel 4 with respect to the cylindrical surface of the guide drum 1, 2 so that the axis of rotation of the head wheel 4 will substantially coincide with the central axis of the guide drum 1, 2 is as follows:

Three headless screws, threaded rods, pins or similar devices 24, 27, are provided in threaded bore holes in the lower portion of the guide drum 1.

The three threaded bores are preferably equally spaced about the lower portion 1 and extending therethrough. When the threaded rods or similar devices 27, 24 are inserted through the bores, their inner ends abut the jacket 20 provided on the upper bearing 12. By adjusting the distance which each of the threaded devies 24, 27 extend into the lower portion 1, the position of the upper bearing 12 can be adjusted. It is noted that the drawing shows the threaded device 24 and the threaded device 27 in the same plane, however, this is done for the sake of clarity to show these devices. Normally they would be disposed 120° from each other and would therefore not be in the same plane.

One of the threaded devices 24, is equipped with a spring 26 loaded rod 25, whereby the device resiliently holds the jacket 20 in place. This permits resilient displacement of the jacket 20 towards the center, with respect to the device 24. The threaded rods 27 do not have resiliency in their adjustment.

Shown disposed above the head wheel 4 in the drawing, is a signal transferring member consisting of a stationary part 30 and of a rotatable part 31 which, in turn, revolves with the head wheel 4. The part 31 is screwed together with the head wheel 4 and has a longitudinal bore hole 32 through which the central fastening device or screw 23 can be tightened or loosened. When loosened, the head of the screw 23 can be tightened against a lower shoulder of the transferring member 31 and lifts the transferring member 31 upwardly together with the head wheel 4 to which it is attached. To remove the head wheel 4 and to install another one in its place, the guide drum portion 2, after loosening of a fastening means (not shown) must first be lifted upward from the device.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a scanning device; for use in magnetic tape instruments of the type using diagonal track scanning and comprising an outer two-part stationary guide drum having a central axis and rotatably supporting an inner head assembly including a head wheel and a motor operable to drive the head wheel about an axis of rotation;

the improvement comprising
said rotatable support including
a lower bearing and an upper bearing, the upper bearing including an outer collar suspended in the guide drum and an inner collar adapted to be secured to the head assembly near the head wheel and rotatably suspended in said outer collar,
upper bearing adjusting means operable from outside the guide drum to tiltlessly adjust the relative radial position of the upper bearing relative to the guide drum, whereby said axis of rotation can be brought into alignment with the central axis before or during operation of the scanning device.

2. In a scanning device as claimed in claim 1, said upper bearing adjusting means including three adjusting elements disposed substantially equally spaced about the periphery of the guide drum, and each comprising an elongated portion extending through the guide drum to abut against the outer collar, and means to move each elongated portion with respect to the guide drum.

3. In a scanning device as claimed in claim 2, wherein a first said adjusting means includes a means to support resiliently the elongated portion, with respect to the guide drum.

4. In a scanning device, as claimed in claim 3, wherein a second and a third said adjusting means each comprise a rod in threaded engagement with a bore defined in the guide drum.

5. In a scanning device, as claimed in claim 4, wherein:
said first adjusting means comprises a threaded casing and a spring loaded rod resiliently projecting to the exterior of said casing; and
said guide drum defines a threaded bore therethrough, operable to receive the threaded casing, so disposed, that the spring loaded rod extends through the guide drum to resiliently abut against said outer collar.

6. In a scanning device, as claimed in claim 1, central fastening means adjustable to releasably secure said head wheel to said motor and being disposed substantially along the axis of rotation,
said guide drum defining an access bore therethrough, disposed substantially along the central axis and above the head wheel, through which access to said central fastening means is available for adjustment.

7. In a scanning device, as claimed in claim 6, further including an adjustment limiter operable to restrict the unfastening of the central fastening means.

8. In a scanning device, as claimed in claim 7, wherein said motor includes a rotating shaft having a longitudinal bore defined therein along the axis of rotation, said central fastening means including a threaded rod operable to be in threaded engagement with said bore and to engage said head wheel, whereby the head wheel may be secured to the shaft.

9. In a scanning device, as claimed in claim 8, said adjustment limiter comprising an inner wall of the guide drum normally disposed over a portion of the threaded rod to limit its axial unfastening movement.

* * * * *